Figure 1:
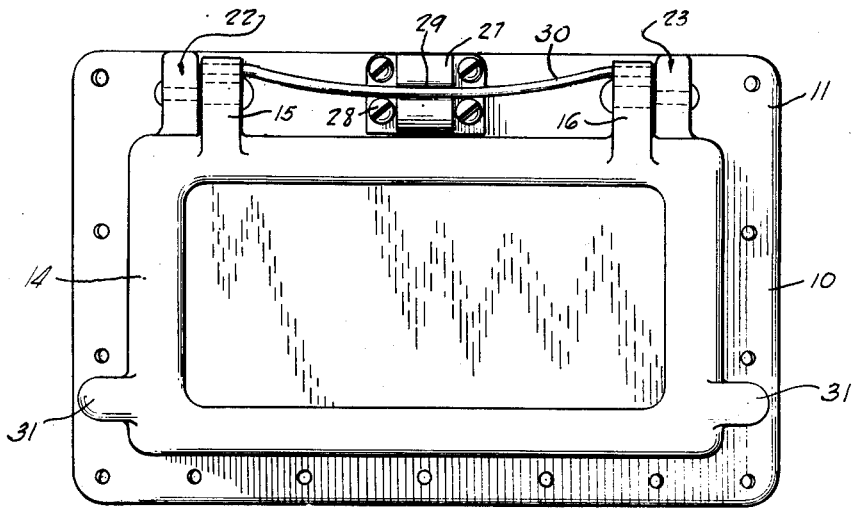

Jan. 11, 1938.  F. M. BOWERS  2,105,071

FILTER GLASS HOLDER

Filed Oct. 1, 1937

INVENTOR.
FREDERICK M. BOWERS.
BY Joshua R. H. Potts
ATTORNEY.

Patented Jan. 11, 1938

2,105,071

UNITED STATES PATENT OFFICE 2,105,071

FILTER GLASS HOLDER

Frederick M. Bowers, Chester, Pa.

Application October 1, 1937, Serial No. 166,799

3 Claims. (Cl. 2—8)

This invention has to do with filter glass holders such as are commonly employed in conjunction with welding shields, helmets and similar protective devices for the purpose of positioning a filter glass in an effective or out-of-the-way position as occasion demands.

At the present time there is known to the public a filter glass holder of the character above identified which comprises a frame that is adapted to be permanently affixed to a welding shield or the like, about a window opening therein. Projecting forwardly from the frame is a casement-like structure, and a filter glass holder is pivotally mounted and adapted to be snugly fitted in the casement structure. The filter holder, together with the filter and protective glass which may be assembled therein, is intended to assume either an effective position in which it is snugly received in the casement, or be swung upwardly into an out-of-the-way ineffective position.

The now known devices made in accordance with the above noted outline have included spring retaining means of various types which are associated with the pivotal mounting of the filter glass holder, but these known devices have not proven to be entirely satisfactory both from the aspect of providing the required operation over long periods of service usage, and from the viewpoint of the manufacture, due to the complex nature and costliness of the manufacturing processes necessary to assemble these spring retaining devices in the completed article.

Accordingly, this invention has in view as its foremost objective the provision of a filter glass holder of the character above noted which includes an improved and highly simplified type of spring device for maintaining the glass holding frame in either an effective or out-of-the-way position. With the improved spring device of this invention the cost of manufacturing and assembling filter glass holders is greatly reduced, and at the same time assurance is given that the device will properly operate over long periods of service usage.

The invention has in view as a further more detailed objective the provision of a filter glass holder in which the glass holding frame is pivotally mounted on a pair of spaced ears, and a leaf or wire spring element is disposed between the ears to provide the desired functions. More particularly this spring element is placed under tension by having its extremities received in notches or recesses formed in the ears, with the intermediate portion received in a groove formed in a boss that is carried centrally of the holder.

With the spring so tensioned the extremities thereof will constantly exert a tendency to move in one direction or another, depending on which side of the spring's "dead center" they are located. Thus if the spring's extremities are on one side of "dead center" they will tend to move the glass holding frame into a closed or effective position and yieldably retain it in such position, or if they are disposed on the opposite side of "dead center" they will tend to move the glass holding frame in an out-of-the-way ineffective position and retain it in that position.

Detailed objects and advantages are associated with mounting the spring in accordance with the above noted objectives, and also in providing suitable structure on the parts of the holder for cooperation therewith. These will in part become apparent and in part be hereinafter stated as the description of the invention proceeds.

The invention, therefore, comprises a filter glass holder including a frame part that is adapted to be permanently affixed to a welding shield or the like, about a window opening therein, and which is formed with a casement. A filter glass holding frame part is pivotally mounted on the first mentioned frame part, with a pair of spaced ears constituting the pivotal mounting. A leaf or wire spring has its extremities received in grooves in the ears of the glass holding frame, and this spring is tensioned between the ears by a boss structure that is mounted on the first mentioned frame part.

For a full and more complete understanding of the invention, reference may be had to the following description and accompanying drawing, wherein—

Figure 2:
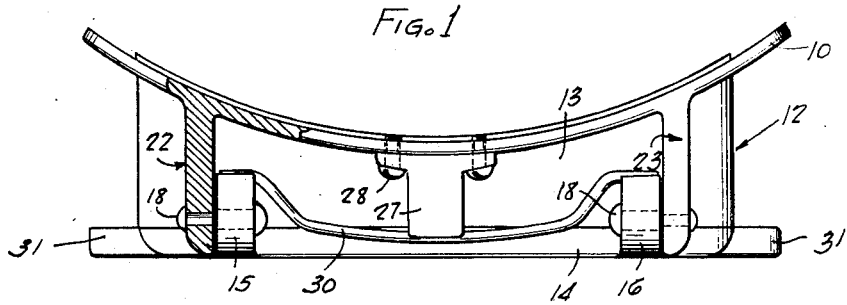
Figures 3, 4:
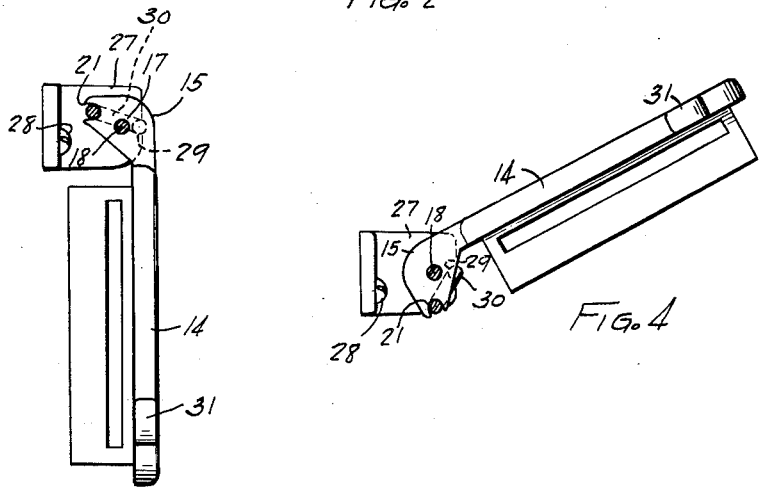

Figure 1 is a front elevational showing of the filter glass holder including a spring device in accordance with the precepts of this invention, Figure 2 is a plan view taken as a top plan view of the holder shown in Figure 1, with certain parts at one side being broken away and shown in section, Figure 3 is a side view of the glass holding frame per se and the pivotal mounting therefor. In this view the spring element and pivotal mounting for the frame are shown in section, and Figure 4 is a view similar to Figure 3 with the glass holder frame shown as swung upwardly in an out-of-the-way position.

Referring now to the drawing, wherein like reference characters denote corresponding parts, a frame part designated 10 is shown as being formed with openings 11 which are adapted to receive rivets or other appropriate fastening elements in permanently securing the frame part 10 in position on a welding shield, helmet or similar protective device. As is brought out in Figure 2, the frame part 10 is curved to conform to the curvature of the shield on which it is to be mounted, and it is notable that this frame part will be mounted about the window opening of the shield. In those instances where the filter glass holder is to be mounted on a flat shield this frame part 10 will, of course, be flat with the curvature eliminated.

Projecting forwardly from the frame part 10 is a casement structure which is referred to in its entirety by the reference character 12, and is shown as having a top wall 13.

A second frame part which constitutes the holder for receiving the filter glass, protecting glass, or other glass elements which may be assembled therein, is shown at 14, and is formed with a pair of upwardly and rearwardly extending ears designated 15 and 16 respectively. Inasmuch as these ears 15 and 16 are of identical construction, only one of them, together with the mounting therefor, needs be described for the purpose of this specification.

Accordingly, upon reference to Figures 3 and 4 it will be noted that the ear 15 is formed with a central opening 17 through which passes a pivot pin 18, and it is important to note that the glass holding frame 14 is disposed at one side of this pivotal opening 17. The ear 15 extends beyond this pivotal opening 17, and for an appreciable distance on the other side thereof. The extremities of the ears 15 and 16 are notched, as shown at 21.

The frame part 10 above the top wall 13 of the casement 12 is formed with a pair of pivot bearing members referred to generally as 22 and 23; the bearing member 22 cooperating with the ear 15, while the member 23 cooperates with the ear 16, and these bearing members are also of duplicate construction.

The bearing member 22 takes the form of a wall; in which the pivot pin 18 has bearing; the pin passing through an opening in the wall. The extremities of the pin 18 are enlarged, as by riveting, to maintain this pivot pin in position in the opening 17 and the opening in the wall.

The frame part 10 above the top wall 13 and intermediate the bearing members 22 and 23 carries a boss 27 that may be anchored in any suitable manner to the frame part 10, as by the screw fastening elements shown at 28. This boss 27 has a front wall that is disposed in a plane that is at the same time parallel to the opening defined by the casement 12 and in advance of the pivot pins 18. This front surface is provided with a groove 29, and the central portion of a wire spring 30 is received in this groove 29, the extremities of the wire spring 30 being fitted in the notches 21 of the ears 15 and 16.

As shown in Figure 1, the glass holder frame 14 may be provided with handle elements shown at 31, to facilitate manipulation of this frame part.

With the central portion of the spring 30 positively yet rotatably held in position in advance of the pivot pins 18, and the extremities of this spring 30 being received in the notches 21 of the ears 15 and 16 on the opposite side of the pivot pins 18, it is evident that this spring will be placed under tension. A "dead center" position for the spring will be defined when the central portion of the spring, the extremities thereof and the pivot pins 18 are all aligned in substantially the same plane.

However, when the extremities of the spring 30 are on the upper side of the pivot pins 18, as shown in Figure 3, the tension of the spring will be effective on the ears 15 and 16 to urge the glass holder frame 14 downwardly into position in the casement 12. However, one desirous of swinging the glass holder frame up into an out-of-the-way ineffective position may grasp the handles 31 for that purpose, and apply sufficient force to overcome the force of the spring 30. When the "dead center" position is passed the extremities of the spring 30 will pass below the pivot pins 18, as shown in Figure 4, whereupon the tendency of the spring will be to move the frame holder part 14 into its upraised position, and the upward movement of this part is limited by engagement of the front surfaces of the ears 15 and 16 with the front edges of the top walls 25 of the housings 22 and 23.

It is, therefore, evident that the effect of the spring 30 is to yieldably maintain the glass holding frame 14 either in an upraised out-of-the-way position, or in an effective position in the casement 12.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. In a filter glass holder including a frame part adapted to be permanently secured to a welding shield about a window opening therein, said frame part being formed with a casement, and a filter glass holding frame part having a pair of spaced ears that are pivotally mounted on the first mentioned frame part, means for yieldably maintaining said glass holding frame part either in closed position in the casement or in an out-of-the-way position comprising a spring having its extremities in engagement with said ears, and means disposed intermediate said ears for placing said spring under tension.

2. In a filter glass holder including a frame part adapted to be permanently secured to a welding shield about a window opening therein, said frame part being formed with a casement, and a filter glass holding frame part having a pair of spaced ears that are pivotally mounted on the first mentioned frame part, said ears being formed with notches, a wire spring having its extremities received in said notches, and a boss element carried by the first mentioned frame part intermediate the pivotal mounting of said ears and having a groove that is disposed in advance of said pivotal mountings, the central portion of said spring being received in said groove.

3. A filter glass holder of the character described comprising a frame part adapted to be permanently secured to a welding shield about a window opening therein, said frame part being formed with a forwardly projecting casement having a top wall, a pair of spaced bearing members carried by said frame part above said top wall of the casement, each of said bearing members being of wall-like formation and being formed with a bearing opening, pivot pins disposed in said bearing openings, a boss carried by said frame part and disposed intermediate said bearing members, said boss having a front face in advance of said pivot pins, said front face being grooved, a filter glass holding frame part formed with a pair of spaced ears that are received in said housings, said ears having openings receiving said pivot pins and notches formed on the edges of the ears which are received in the housings, and a wire spring having its extremities fitted in said notches in the ears and its central portion received in said groove.

FREDERICK M. BOWERS.